US009200141B2

(12) United States Patent
Tahara et al.

(10) Patent No.: US 9,200,141 B2
(45) Date of Patent: Dec. 1, 2015

(54) RUBBER COMPOSITION, METHOD FOR PREVENTING DISCOLORATION OF RUBBER COMPOSITION, AND TIRE

(75) Inventors: Seichi Tahara, Tokyo (JP); Kumi Fujiki, Tokyo (JP); Masaaki Tsuchihashi, Wakayama (JP); Tetsuo Takano, Wakayama (JP)

(73) Assignees: BRIDGESTONE CORPORATION, Tokyo (JP); KAO CORPORATION, Tokyo (JP)

( * ) Notice: Subject to any disclaimer, the term of this patent is extended or adjusted under 35 U.S.C. 154(b) by 63 days.

(21) Appl. No.: 13/816,145

(22) PCT Filed: Aug. 11, 2011

(86) PCT No.: PCT/JP2011/068381

§ 371 (c)(1),
(2), (4) Date: Mar. 25, 2013

(87) PCT Pub. No.: WO2012/020826

PCT Pub. Date: Feb. 16, 2012

(65) Prior Publication Data

US 2013/0184387 A1 Jul. 18, 2013

(30) Foreign Application Priority Data

Aug. 11, 2010 (JP) ................................ 2010-180480
Aug. 11, 2010 (JP) ................................ 2010-180481

(51) Int. Cl.

| | |
|---|---|
| ***C08K 5/1545*** | (2006.01) |
| ***C08K 5/1535*** | (2006.01) |
| ***B60C 1/00*** | (2006.01) |
| ***C08L 9/06*** | (2006.01) |
| ***C08L 21/00*** | (2006.01) |
| ***C08L 71/02*** | (2006.01) |
| ***C08K 5/17*** | (2006.01) |
| ***C08L 7/00*** | (2006.01) |
| *C08K 5/06* | (2006.01) |

(52) U.S. Cl.

CPC ............ *C08K 5/1545* (2013.01); *B60C 1/0016* (2013.04); *B60C 1/0025* (2013.04); *C08K 5/1535* (2013.01); *C08K 5/17* (2013.01); *C08L 7/00* (2013.01); *C08L 9/06* (2013.01); *C08L 21/00* (2013.01); *C08L 71/02* (2013.01); *C08K 5/06* (2013.01)

(58) Field of Classification Search

USPC .......................................................... 524/110
See application file for complete search history.

(56) References Cited

U.S. PATENT DOCUMENTS

| | | | | |
|---|---|---|---|---|
| 4,033,933 | A | 7/1977 | Shimizu et al. | |
| 5,714,533 | A * | 2/1998 | Hatakeyama et al. | 524/140 |
| 6,994,137 | B2 * | 2/2006 | Sandstrom | 152/525 |
| 8,148,448 | B2 * | 4/2012 | Takahara et al. | 523/166 |
| 2004/0198876 | A1 | 10/2004 | Shiraishi et al. | |
| 2006/0089451 | A1 * | 4/2006 | Nakazono et al. | 524/571 |
| 2008/0097023 | A1 | 4/2008 | Kameda et al. | |
| 2008/0202660 | A1 * | 8/2008 | Abdallah et al. | 152/525 |

FOREIGN PATENT DOCUMENTS

| | | | | |
|---|---|---|---|---|
| JP | 53-008643 | A | 1/1978 | |
| JP | 05-194790 | A | 8/1993 | |
| JP | 05194790 | A * | 8/1993 | C08L 21/00 |
| JP | 10-017712 | A | 1/1998 | |
| JP | 11-130908 | A | 5/1999 | |
| JP | 2001-098111 | A | 4/2001 | |
| JP | 2001-200105 | A | 7/2001 | |
| JP | 2002-103355 | A | 4/2002 | |
| JP | 2004-204126 | A | 7/2004 | |
| JP | 2004-307812 | A | 11/2004 | |
| JP | 2005-343963 | A | 12/2005 | |
| JP | 2008-274158 | A | 11/2008 | |
| JP | 2009-161667 | A | 7/2009 | |
| JP | 2009161667 | A * | 7/2009 | |
| JP | 2010-001388 | A | 1/2010 | |

OTHER PUBLICATIONS

Translation of JP 05-194790, Aug. 3, 1993.*
Translation of JP 2009-161667, Jul. 23, 2009.*

* cited by examiner

*Primary Examiner* — Hui Chin
(74) *Attorney, Agent, or Firm* — Sughrue Mion, PLLC

(57) ABSTRACT

Provided is a rubber composition capable of preventing discoloration due to an amine-based antiaging agent and wax without deteriorating the ozone resistance not only in cases where the rubber composition is used in side wall portions of tires but also in cases where the rubber composition is used in tread portions of tires. The rubber composition comprises at least one rubber component selected from a dienic synthetic rubber and a natural rubber and, as incorporated therein, at least one nonionic surfactant selected from specific compounds.

7 Claims, No Drawings

RUBBER COMPOSITION, METHOD FOR PREVENTING DISCOLORATION OF RUBBER COMPOSITION, AND TIRE

CROSS REFERENCE TO RELATED APPLICATIONS

This application is a National Stage of International Application No. PCT/JP2011/068381, filed on Aug. 11, 2011, which claims priority from Japanese Patent Application Nos. 2010-180480, filed Aug. 11, 2010, and JP 2010-180481, filed Aug. 11, 2010, the contents of all of which are incorporated herein by reference in their entirety.

TECHNICAL FIELD

The present invention relates to a rubber composition, a method for preventing discoloration of a rubber composition, and a tire using the rubber composition, and relates to a rubber composition capable of preventing tire skin rubber from browning and especially favorable for use for tread rubber, to a method for preventing discoloration of a rubber composition and to a tire using the rubber composition.

BACKGROUND ART

In general, the degradation of a rubber product from a starting material of a natural rubber or a dienic synthetic rubber goes on in the presence of ozone whereby the surface thereof is cracked. The cracking further goes on owing to the static and dynamic stress given to the rubber product, and as a result, the rubber product is thereby broken.

For preventing generation and propagation of the cracks owing to ozone, a rubber composition containing, as an antiaging agent, an amine-based antiaging agent such as N-(1,3-dimethylbutyl)-N'-phenyl-p-phenylenediamine or the like is applied to rubber products. For the purpose of static prevention from ozone, wax is incorporated into the rubber composition for forming a protective film on the surfaces of the rubber products.

However, though the above-mentioned amine-based antiaging agent and wax could be effective for preventing generation and propagation of cracks in the presence of ozone, those ingredients may readily move through the polymer substrate such as the rubber component or the like and may transfer onto the surfaces of rubber products, especially tires within a short period of time, and may discolor the rubber products during storage or in use thereof to worsen the outward appearance of those rubber products. Here, in case where wax transfers onto the surface, then the surface may whiten, and in case where the amine-based antiaging agent transfers on the surface, then the surface may brown.

To the above, a technique of incorporating a polyoxyethylene ether-based nonionic surfactant or a sorbitan-based surfactant into a rubber composition for tire side walls for preventing the discoloration by the amine-based antiaging agent and wax has been disclosed (PTL 1, PTL 2, PTL 3). However, according to these techniques, it is still impossible to fully prevent discoloration of rubber compositions for treads.

CITATION LIST

Patent Literatures

PTL 1: JP-A 5-194790
PTL 2: JP-A 2004-307812
PTL 3: JP-A 2001-200105

SUMMARY OF INVENTION

Technical Problem

Accordingly, an object of the present invention is to provide a rubber composition capable of preventing discoloration due to an amine-based antiaging agent and wax without deteriorating the ozone resistance not only in cases where the rubber composition is used in side wall portions of tires but also in cases where the rubber composition is used in tread portions of tires and keeping a good outward appearance of tires, to provide a method for preventing discoloration of a rubber composition, and to provide a tire using the rubber composition.

Solution to Problem

The present inventors have assiduously studied for attaining the above-mentioned object and, as a result, have found that, when a nonionic surfactant having a specific structure is incorporated in a rubber component, then there is obtained a rubber composition which, even when used in tread portions of tires, is prevented from being discolored due to an amine-based antiaging agent and wax without deteriorating the ozone resistance thereof, and then have performed the present invention.

Specifically, the present invention provides the following:

[1] A rubber composition comprising at least one rubber component selected from a dienic synthetic rubber and a natural rubber and, as incorporated therein, at least one nonionic surfactant selected from the compounds represented by the following formula (I):

[Chem. 1]

$$R^2O(R^1O)_nH \qquad (I)$$

[In the formula (I), $R^2$ represents an alkyl group or an alkenyl group having from 1 to 15 carbon atoms, and the alkyl group and the alkenyl group may be any of linear chain-like, branched chain-like or cyclic ones; $R^1$ represents an alkylene group having from 2 to 4 carbon atoms; n indicates a mean addition molar number, and is from 16 to 30];

[2] The rubber composition according to the above [1], containing wax as incorporated therein;

[3] The rubber composition according to the above [1] or [2], containing an antiaging agent as incorporated therein;

[4] The rubber composition according to the above [3], wherein the antiaging agent is an amine-based antiaging agent;

[5] The rubber composition according to any of the above [1] to [4], wherein the nonionic surfactant is incorporated in an amount of from 0.1 to 10 parts by mass relative to 100 parts by mass of the rubber component therein;

[6] The rubber composition according to any of the above [1] to [5], which contains, as the rubber component, at least one selected from a natural rubber, an isoprene rubber, a styrene-butadiene copolymer rubber and a polybutadiene rubber;

[7] The rubber composition according to any of the above [1] to [6], wherein the rubber component is a styrene-butadiene copolymer rubber alone, or a styrene-butadiene copolymer rubber and a polybutadiene rubber, or a natural rubber and a styrene-butadiene copolymer rubber, or a natural rubber and a polybutadiene rubber;

[8] The rubber composition according to any of the above [1] to [7], wherein the styrene-butadiene copolymer rubber accounts for from 50 to 100 parts by mass in 100 parts by mass of the rubber component;

[9] The rubber composition according to any of the above [1] to [8], wherein in the nonionic surfactant of the above formula (I), $R^2$ is an alkyl group or an alkenyl group having from 6 to 15 carbon atoms, $R^1$ is an alkylene group having from 2 or 3 carbon atoms, and n is from 16 to 30;

[10] A tire of which the outer skin is formed of the rubber composition of any of the above [1] to [9]; and

[11] The tire according to the above [10], of which the outer skin is a tread portion thereof;

[12] A method for preventing discoloration of a rubber composition, comprising incorporating at least one nonionic surfactant selected from the compounds represented by the following formula (I) to at least one rubber component selected from a dienic synthetic rubber and a natural rubber:

[Chem. 2]

$$R^2O(R^1O)_nH \tag{I}$$

[In the formula (I), $R^2$ represents an alkyl group or an alkenyl group having from 1 to 15 carbon atoms, and the alkyl group and the alkenyl group may be any of linear chain-like, branched chain-like or cyclic ones; $R^1$ represents an alkylene group having from 2 to 4 carbon atoms; n indicates a mean addition molar number, and is from 12 to 30];

[13] The method for preventing discoloration according to the above [12], wherein the mean addition molar number is from 16 to 30;

[14] A rubber composition comprising at least one rubber component selected from a dienic synthetic rubber and a natural rubber and, as incorporated therein, at least one nonionic surfactant selected from the compounds represented by the following formula (II) and the compounds represented by the following formula (III):

[Chem. 3]

(II)

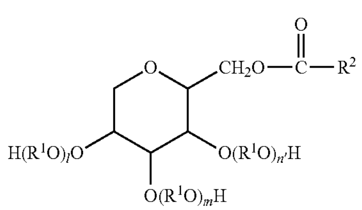

[Chem. 4]

(III)

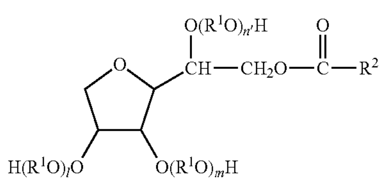

[In the formulae (II) and (III), $R^2$ represents an alkyl group or an alkenyl group having from 1 to 14 carbon atoms, and the alkyl group and the alkenyl group may be any of linear chain-like, branched chain-like or cyclic ones; $R^1$ represents an alkylene group having from 2 to 4 carbon atoms; l, m and n' each indicate a mean addition molar number, and (l+m+n') is from 3 to 50];

[15] The rubber composition according to the above [14], containing wax as incorporated therein;

[16] The rubber composition according to the above [14] or [15], containing an antiaging agent as incorporated therein;

[17] The rubber composition according to the above [16], wherein the antiaging agent is an amine-based antiaging agent;

[18] The rubber composition according to any of the above [14] to [17], wherein the nonionic surfactant is incorporated in an amount of from 0.1 to 10 parts by mass relative to 100 parts by mass of the rubber component therein;

[19] The rubber composition according to any of the above [14] to [18], which contains, as the rubber component, at least one selected from a natural rubber, an isoprene rubber, a styrene-butadiene copolymer rubber and a polybutadiene rubber;

[20] The rubber composition according to any of the above [14] to [19], wherein the rubber component is a styrene-butadiene copolymer rubber alone, or a styrene-butadiene copolymer rubber and a polybutadiene rubber, or a natural rubber and a styrene-butadiene copolymer rubber, or a natural rubber and a polybutadiene rubber;

[21] The rubber composition according to any of the above [14] to [20], wherein the styrene-butadiene copolymer rubber accounts for from 50 to 100 parts by mass in 100 parts by mass of the rubber component;

[22] The rubber composition according to any of the above [14] to [21], wherein in the nonionic surfactant of the above formulae (II) and (III), $R^2$ is an alkyl group or an alkenyl group having from 8 to 14 carbon atoms, $R^1$ is an alkylene group having from 2 or 3 carbon atoms, and the sum total of l, m and n' is from 4 to 30;

[23] A tire of which the outer skin is formed of the rubber composition of any of the above [14] to [22];

[24] The tire according to the above [23], of which the outer skin is a tread portion or a side wall portion thereof;

[25] A method for preventing discoloration of a rubber composition, comprising incorporating at least one nonionic surfactant selected from the compounds represented by the following formula (II) and the compounds represented by the following formula (III) to at least one rubber component selected from a dienic synthetic rubber and a natural rubber:

[Chem. 5]

(II)

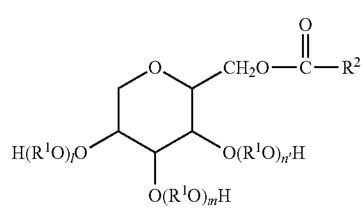

[Chem. 6]

(III)

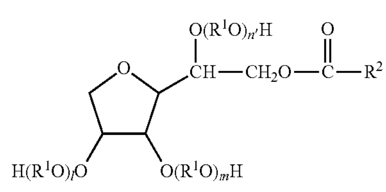

[In the formulae (I) and (II), $R^2$ represents an alkyl group or an alkenyl group having from 1 to 14 carbon atoms, and the alkyl group and the alkenyl group may be any of linear chain-like, branched chain-like or cyclic ones; $R^1$ represents an alkylene group having from 2 to 4 carbon atoms; l, m and n' each indicate a mean addition molar number, and (l+m+n') is from 3 to 50].

Advantageous Effects of Invention

According to the present invention, by incorporating the nonionic surfactant having a specific structure to the rubber component, there are provided a rubber composition capable of preventing discoloration due to an amine-based antiaging agent and wax without deteriorating the ozone resistance not only in cases where the rubber composition is used in side wall portions of tires but also in cases where the rubber composition is used in tread portions of tires, a method for preventing discoloration of a rubber composition, and a tire using the rubber composition.

Description of Embodiments

The present invention is described in detail hereinunder.

The rubber composition and the discoloration preventing method of the present invention comprise incorporating at least one of the nonionic surfactants represented by the above-mentioned formula (I) or at least one of the nonionic surfactants represented by the above-mentioned formula (II) or formula (III) in at least one rubber component selected from a dienic synthetic rubber and a natural rubber.

Browning of the outer skin of a tire results from transfer of an antiaging agent and wax onto the surface of the tire through the polymer substrate such as a rubber component or the like to cause precipitation of wax on the surface of the tire thereby roughening the surface to provide light scattering thereon while, in addition, the antioxidant adhering to the roughened surface is oxidized to be a coloring component, whereby the outer skin of the tire appears to be discolored in brown.

In the rubber composition and the discoloration preventing method of the present invention, the nonionic surfactant represented by the above-mentioned formula (I) or the nonionic surfactant represented by the above-mentioned formula (II) or formula (III) flattens and smoothens the roughened surface of wax precipitated on the surface to thereby improve the light-scattering condition to prevent browning. Specifically, in the nonionic surfactant represented by the above-mentioned formula (I), the length of the hydrophobic group $R^2$ and the length of the hydrophilic group $(R^1O)_n$ are specifically defined, and in the nonionic surfactant represented by the above-mentioned formula (II) or (III), the length of the hydrophobic group $R^2$ and the length (l, m, n) of the hydrophilic group ($R^1O$) are specifically defined so that the miscibility of the surfactant with the rubber composition is thereby controlled, or that is, the surfactant can have suitable miscibility with the rubber composition to thereby exhibit the above-mentioned function as precipitating on the surface of a tire.

In the rubber composition and the discoloration preventing method of the invention, the amount of the nonionic surfactant is preferably from 0.1 to 10 parts by mass relative to 100 parts by mass of the rubber component, more preferably from 0.5 to 7 parts by mass, even more preferably from 0.5 to 5 parts by mass. When the amount is at least 0.1 parts by mass, then the surfactant is effective for preventing discoloration by an amine-based antiaging agent and wax; and when at most 10 parts by mass, then the surfactant does not bloom and can prevent any excessive glossiness, and in addition, the surfactant does not cause surface stickiness to lower the workability with the composition.

Adding the surfactant does not lower the ozone resistance.

The rubber component to be used in the rubber composition and the discoloration preventing method of the present invention includes a dienic synthetic rubber and a natural rubber. The dienic synthetic rubber includes an isoprene rubber (IR), a polybutadiene rubber (BR), a styrene-butadiene copolymer rubber (SBR), etc. One alone or two or more of these rubber components may be used here either singly or as blended. Specifically, it is desirable that the rubber component contains at least one selected from a natural rubber, an isoprene rubber, a styrene-butadiene copolymer rubber and a polybutadiene rubber. More preferably, the rubber component is a styrene-butadiene copolymer rubber alone, a mixture of a styrene-butadiene copolymer rubber and a polybutadiene rubber, a mixture of a natural rubber and a styrene-butadiene copolymer rubber, or a mixture of a natural rubber and a polybutadiene rubber.

In general, the rubber component preferably used in the tread portion mainly comprises SBR, having an SBR content of from 50 to 100% by mass, while the rubber component preferably used in the side wall portion is a mixture of a natural rubber and BR.

The nonionic surfactant to be used in the rubber composition and the discoloration preventing method of the present invention is represented by the above-mentioned formula (I), or by the above-mentioned formula (II) or (III). One alone or two or more different types of those nonionic surfactants may be used here either singly or as combined, for which commercial products are preferred.

In the formula (I), $R^2$ represents an alkyl group or an alkenyl group having from 1 to 15 carbon atoms, and the alkyl group and the alkenyl group may be any of linear chain-like, branched chain-like or cyclic ones. The carbon number of the alkyl group and the alkenyl group is preferably from 6 to 15, more preferably from 6 to 14, even more preferably from 8 to 12, from the viewpoint of the tackiness, the adhesiveness and the discoloration degree. Concretely, there are preferably mentioned one or more alkyl groups selected from a hexyl group, an isoheptyl group, a 2-ethylhexyl group, an octyl group, a nonyl group, an isononyl group, a decyl group, an undecyl group, a dodecyl group, a tridecyl group, an isotridecyl group, a tetradecyl group, and a pentadecyl group. More preferred are one or more selected from a 2-ethylhexyl group, an octyl group, a nonyl group, an isononyl group, a decyl group, an undecyl group and a dodecyl group; and even more preferred are one or more selected from a nonyl group, an isononyl group, a decyl group and an undecyl group.

$R^2$ in the formula (II) and the formula (III) is an alkyl group or an alkenyl group having from 1 to 14 carbon atoms respectively, and the alkyl group and the alkenyl group may be any of linear chain-like, branched chain-like or cyclic ones. The carbon number of these alkyl group and alkenyl group is from 1 to 14, but preferably from 8 to 14 and more preferably from 10 to 14, from the viewpoint of the discoloration degree. Concretely, preferred are one or more alkyl groups selected from a 2-ethylhexyl group, an octyl group, a nonyl group, an isononyl group, a decyl group, an undecyl group, a dodecyl group, a tridecyl group, an isotridecyl group and a tetradecyl group; and more preferred are one or more selected from a decyl group, an undecyl group, a dodecyl group, a tridecyl group, an isotridecyl group, and a tetradecyl group.

$R^1$ in the formula (I), the formula (II) and the formula (III) is an alkylene group having from 2 to 4 carbon atoms, preferably an alkylene group having 2 or 3 carbon atoms, and more preferably an alkylene group having 2 carbon atoms.

n in the formula (I) is from 16 to 30 but preferably from 16 to 25, from the viewpoint of the tackiness, the adhesiveness, the discoloration degree and the vulcanization speed (productivity). However, in the case of the discoloration preventing method for a rubber composition in which it is not always necessary to specifically consider the vulcanization speed (productivity), n in the formula (I) is from 12 to 30, preferably from 16 to 30, more preferably from 16 to 25.

From these, in the nonionic surfactant of the above-mentioned formula (I) to be used in the rubber composition of the present invention, preferred is a combination where $R^2$ is an alkyl group or an alkenyl group having from 6 to 15 carbon atoms, $R^1$ is an alkylene group having 2 or 3 carbon atoms, and n is from 16 to 30; more preferred is a combination where $R^2$ is an alkyl group or an alkenyl group having from 8 to 12 carbon atoms, $R^1$ is an alkylene group having 2 or 3 carbon atoms, and n is from 16 to 30; even more preferred is a combination where $R^2$ is an alkyl group or an alkenyl group having from 8 to 12 carbon atoms, $R^1$ is an alkylene group having 2 or 3 carbon atoms, and n is from 16 to 25; and still more preferred is a combination where $R^2$ is an alkyl group or an alkenyl group having from 8 to 12 carbon atoms, $R^1$ is an alkylene group having 2 carbon atoms, and n is from 16 to 25.

In the nonionic surfactant of the above-mentioned formula (I) to be used in the discoloration preventing method of the present invention, preferred is a combination where $R^2$ is an alkyl group or an alkenyl group having from 6 to 15 carbon atoms, $R^1$ is an alkylene group having 2 or 3 carbon atoms, and n is from 12 to 30; more preferred is a combination where $R^2$ is an alkyl group or an alkenyl group having from 8 to 12 carbon atoms, $R^1$ is an alkylene group having 2 or 3 carbon atoms, and n is from 12 to 30; even more preferred is a combination where $R^2$ is an alkyl group or an alkenyl group having from 8 to 12 carbon atoms, $R^1$ is an alkylene group having 2 or 3 carbon atoms, and n is from 16 to 30; still more preferred is a combination where $R^2$ is an alkyl group or an alkenyl group having from 8 to 12 carbon atoms, $R^1$ is an alkylene group having 2 or 3 carbon atoms, and n is from 16 to 25; and further more preferred is a combination where $R^2$ is an alkyl group or an alkenyl group having from 8 to 12 carbon atoms, $R^1$ is an alkylene group having 2 carbon atoms, and n is from 16 to 25.

Preferably, l, m and n' in the formula (II) and the formula (III) each are independently from 0 to 50, more preferably from 0 to 30, even more preferably from 0 to 20 from the viewpoint of the discoloration degree. The sum total of l, m and n' is from 3 to 50, preferably from 4 to 30, more preferably from 6 to 20 from the viewpoint of the discoloration degree. From those viewpoints, preferably, l, m and n' each are independently from 0 to 50 and the sum total of l, m and n' is from 3 to 50, more preferably, l, m and n' each are independently from 0 to 30 and the sum total of l, m and n' is from 4 to 30, and even more preferably, l, m and n' each are independently from 0 to 20 and the sum total of l, m and n' is from 6 to 20.

In the nonionic surfactant of the above-mentioned formula (II) and the formula (III) to be used in the rubber composition and the discoloration preventing method of the present invention, preferred is a combination where $R^2$ is an alkyl group or an alkenyl group having from 1 to 14 carbon atoms, $R^1$ is an alkylene group having 2 or 3 carbon atoms, and the sum total of l, m and n' is from 3 to 50; more preferred is a combination where $R^2$ is an alkyl group or an alkenyl group having from 8 to 14 carbon atoms, $R^1$ is an alkylene group having 2 or 3 carbon atoms, and the sum total of l, m and n' is from 4 to 30; even more preferred is a combination where $R^2$ is an alkyl group or an alkenyl group having from 10 to 14 carbon atoms, $R^1$ is an alkylene group having 2 or 3 carbon atoms, and the sum total of l, m and n' is from 4 to 30; still more preferred is a case where $R^2$ is an alkyl group or an alkenyl group having from 10 to 14 carbon atoms, $R^1$ is an alkylene group having 2 or 3 carbon atoms, and the sum total of l, m and n' is from 6 to 20; further more preferred is a combination where $R^2$ is an alkyl group or an alkenyl group having from 10 to 14 carbon atoms, $R^1$ is an alkylene group having 2 carbon atoms, and the sum total of l, m and n' is from 6 to 20.

Preferably, the HLB value (hydrophilicity/lipophilicity balance value) of the nonionic surfactant represented by the above formula (I) is from 10 to 19. Here, the HLB value is defined by the Griffin's formula mentioned below.

$$HLB=20\times Mw/M$$

(wherein M represents the molecular weight of a nonionic surfactant; and Mw represents the molecular weight of the hydrophilicity moiety of the nonionic surfactant).

Preferably, the HLB value (hydrophilicity/lipophilicity balance value) of the nonionic surfactant represented by the above formula (II) or formula (III) is from 8 to 19. Here, the HLB value is defined by the Atlas' formula mentioned below.

$$HLB=20(1-S/A)$$

(where S represents the saponification value of the ester-type surfactant; and A represents the acid value of the fatty acid that constitutes the surfactant).

When the HLB value of the nonionic surfactant represented by the above formula (I) is at least 10, then the lipophilicity thereof can be depressed and the miscibility thereof with rubber can also be depressed to thereby enable transfer of the surfactant to surface; and when the value is at most 19, then the miscibility of the surfactant with rubber can be increased to thereby facilitate kneading of the rubber composition while preventing the surfactant from being adsorbed by filler to also facilitate transfer of the surfactant to surface.

More preferably, the HLB value of the nonionic surfactant represented by the above formula (I) is from 15 to 19, even more preferably from 15 to 18. When the HLB value is at least 15, the transfer rate of the surfactant to surface can be further increased to thereby promote the browning preventing effect thereof.

When the HLB value of the nonionic surfactant represented by the above formula (II) or formula (III) is at least 8, then the lipophilicity thereof can be depressed and the miscibility thereof with rubber can also be depressed to thereby enable transfer of the surfactant to surface; and when the value is at most 19, then the miscibility of the surfactant with rubber can be increased to thereby facilitate kneading of the rubber composition while preventing the surfactant from being adsorbed by filler to also facilitate transfer of the surfactant to surface.

More preferably, the HLB value of the nonionic surfactant represented by the above formula (II) or the formula (III) is from 10 to 17, even more preferably from 11 to 17. When the HLB value is at least 10, the transfer rate of the surfactant to surface can be further increased to thereby promote the browning preventing effect thereof; and when the value is at most 17, then the scorching time for the rubber composition is not shortened and the workability of the composition is not worsened.

Preferably, an amine-based antiaging agent and wax are incorporated in the rubber composition for the purpose of preventing generation and propagation of cracks by ozone. The amine-based antiaging agent includes N-(1,3-dimethylbutyl)-N'-phenyl-p-phenylenediamine, etc.

In addition, the rubber composition may contain carbon black or silica as a reinforcing filler. Not specifically defined, any commercial products of carbon black and silica are usable here. Above all, preferred are wet-type silica, dry-type silica or colloidal silica, and more preferred is wet-type silica. Both carbon black and silica can be used here as combined. The amount of the reinforcing filler to be in the composition is preferably from 30 to 120 parts by mass relative to 100 parts by mass of the rubber component therein. In case where silica is used as the reinforcing filler, a silane coupling agent may be incorporated in the composition in an amount of from 1 to 20 parts by mass or so relative to 100 parts by mass of silica from the viewpoint of the reinforcing capability thereof, but in an amount of from 6 to 12 parts by mass from the viewpoint of the pyrogenicity thereof.

Further, any additive generally used in the rubber industry, such as a vulcanizing agent, a vulcanization promoter, a scorch inhibitor, a softening agent, zinc oxide, stearic acid or the like may be suitably selected and incorporated in the rubber composition within a range not detracting from the object of the invention. For the additives, commercial products are favorably used.

The rubber composition can be produced by kneading the rubber component and the nonionic surfactant optionally along with additives that are suitably selected, then warming and extruding the resulting mixture.

The pneumatic tire of the present invention is characterized in that the above-mentioned rubber composition is applied to any of the rubber parts of the tire, and preferably, the rubber composition is applied to the outer skin of the tire, especially to the tread portion or the side wall portion thereof. Since the tire contains the above-mentioned nonionic surfactant, the amine-based antiaging agent and wax therein are prevented from moving to the surface of the tire, and the tire is prevented from discoloring and its outward appearance is kept good for a long period of time.

EXAMPLES

The present invention is described in more detail with reference to the following Examples, however, the present invention is not whatsoever limited by the following Examples.

Examples 1 to 11 and Comparative Examples 1 to 10

A rubber composition comprising the formulation shown in Table 1 (in which the rubber component is mainly SBR) and containing the nonionic surfactant in the amount shown in Table 2 was prepared, and vulcanized at 160° C. for 14 minutes. Thus obtained, the vulcanized rubber was evaluated for the tensile stress, the ozone resistance, the tackiness, the adhesiveness, the vulcanization speed and the discoloration degree thereof according to the methods mentioned below. The results are shown in Table 2.

(1) Tensile Stress

As a typical index of rubber properties, the tensile stress at 300% elongation was measured. Concretely, using a JIS #3 dumbbell-type test piece, the tensile stress at 300% elongation was measured according to JIS K 6251:2004. The data were expressed as exponential values based on the value 100 of Comparative Example 1. The samples having a larger exponential value have a larger tensile stress at 300% elongation.

(2) Ozone Resistance

According to JIS K 6259:2004, each test piece produced in Examples 1 to 10 and Comparative Examples 1 to 9 was tested for ozone degradation at a temperature of 40° C. and an ozone concentration of 50 pphm and under the condition of 20% elongation. After 50 hours, the test piece was checked for degradation and was evaluated based on the presence or absence of cracks generated therein.

(3) Tack Test

Each test piece was tested according to JIS-T 9233-3.8.6 (2) Mitsuhashi Method (Picma Tack test). As each test piece of Examples and Comparative Examples, one piece having a width of 15 mm and a length of 100 mm was collected. The surface of an adhesive disc (made of aluminium, having a diameter of 50 mm and a thickness of 14 mm) was washed with hexane, and dried at room temperature for 30 minutes. The sample (test piece) was stuck to the disc with a double adhesive tape. The start button of the tester was pushed to lower the adhesive disc so that the disc could be kept in contact with the sample. After kept in contact for 30 seconds under a load of 500 gf, the sample was pulled up at 30 mm/sec. (Test piece temperature, adhesive disc temperature, laboratory temperature: 23° C.) The power by which the sample was separated from the adhesive disc was measured five times, and the data were averaged. The average was expressed as an exponential value based on the value 100 of the rubber composition of Comparative Example 1. The samples having a larger exponential value have a higher tackiness and are excellent in workability.

(4) Adhesiveness Test

Three steel cords (outer diameter 0.5 mm×length 300 mm) each plated with brass (Cu: 63% by mass, Zn: 37% by mass) were aligned in parallel to each other at intervals of 10 mm, and these steel cords were coated on both sides thereof with each rubber composition, and vulcanized at 160° C. for 20 minutes to prepare a sample.

According to ASTM-D-2229, each sample was tested for the adhesiveness thereof. Briefly, the steel cords were drawn away from each sample, and the rubber coating condition on each cord was visually checked and expressed in terms of from 0 to 100% as an index of the adhesiveness of the sample.

(5) Vulcanization Speed

According to JIS-K-6300-1994, Comparative Examples 1 to 3 were evaluated as controls (having an exponential value of 100) to other compositions. Samples having a larger exponential value take a longer time for vulcanization.

(6) Degree of Discoloration

Using a colorimeter (Nippon Denshoku's model name, NF333), each test piece of vulcanized rubber was tested for the degree of discoloration thereof. The found data were expressed as L*, a*, b*. L* indicates the brightness, and a* and b* each indicate the hue. The value a* and the value b* of 0 each mean colorless. The value a* of a higher positive means nearer to red while the value a* of a higher negative means nearer to green; and the value b* of a higher positive means nearer to yellow while the value b* of a higher negative means nearer to blue. The degree of discoloration just after vulcanization was determined by measuring the value b* just after vulcanization and by visually checking the level of discoloration just after vulcanization. Under the outdoor environment in summer season (under a roof as shielded from rain with receiving direct sunlight for a predetermined period of time a day), the vulcanized rubber piece was left for 1 month. After thus left, the rubber piece was evaluated for the degree of discoloration based on the measured value b* and the visually-inspected discoloration degree.

The degree of discoloration was evaluated in five ranks. 5 was given to the sample with noticeable discoloration; 4 was given to the sample of which a half or more discolored; 3 was given to the sample of which less than a half discolored; 2 was given to the sample which discolored only a little; and 1 was given to the sample which did not discolor.

From a composition prepared by incorporating the compound A into the rubber composition for tire treads, and from the rubber composition not containing a surfactant, radial tires for passenger cars each having a tire size of 205/65R15 were produced according to an ordinary method, and tested in the same discoloration test as above. The results are shown in Table 3.

TABLE 1

| | Composition 1 (part by mass) | Composition 2 (part by mass) | Composition 3 (part by mass) |
|---|---|---|---|
| SBR *1 | 100 | 100 | 80 |
| Natural Rubber | — | — | 20 |
| Carbon Black *2 | 50 | 25 | 25 |
| Silica *3 | — | 25 | 25 |
| Silane Coupling Agent *4 | — | 2 | 2 |
| Stearic Acid | 1 | 1 | 1 |
| Wax *5 | 2 | 2 | 2 |
| Antiaging Agent 6PPD *6 | 4 | 4 | 4 |
| Antiaging Agent TMQ *7 | 0.3 | 0.3 | 0.3 |
| Zinc Flower | 2.5 | 2.5 | 2.5 |

TABLE 1-continued

| | Composition 1 (part by mass) | Composition 2 (part by mass) | Composition 3 (part by mass) |
|---|---|---|---|
| Vulcanization Promoter DPG *8 | 0.6 | 0.8 | 0.8 |
| Vulcanization Promoter MBTS *9 | 0.6 | 0.8 | 0.8 |
| Vulcanization Promoter CBS *10 | 0.6 | 0.9 | 0.9 |
| Sulfur | 1.5 | 1.5 | 1.5 |
| Nonionic Surfactant | variable | variable | variable |

*1 JSR's "SBR #1500"
*2 Tokai Carbon's "Seast 7HM"
*3 Tosoh Silica's "Nipseal AQ"
*4 Bis(3-ethoxysilylpropyl) tetrasulfide
*5 Microcrystalline wax, Nippon Seiro's "Ozoace-0701"
*6 Ohuchi Shinko Chemical's "Nocrack 6C"
*7 Seiko Chemical's "Nonflex RD-S"
*8 Ohuchi Shinko Chemical's "Nocceler D"
*9 Ohuchi Shinko Chemical's "Nocceler DM"
*10 Sanshin Chemical's "Sanceler CM-G"

TABLE 2-1

| | Example 1 Composition 1 | Example 2 Composition 1 | Example 3 Composition 1 | Example 4 Composition 2 | Example 5 Composition 3 |
|---|---|---|---|---|---|
| Compound A | 1.5 | 0.5 | 2 | 1.5 | 1.5 |
| Compound B | — | — | — | — | — |
| Compound C | — | — | — | — | — |
| Compound D | — | — | — | — | — |
| Compound E | — | — | — | — | — |
| Compound F | — | — | — | — | — |
| Compound G | — | — | — | — | — |
| Compound H | — | — | — | — | — |
| Compound I | — | — | — | — | — |
| Compound J | — | — | — | — | — |
| 300% Modulus | 100 | 100 | 102 | 104 | 98 |
| Ozone Resistance (presence or absence of cracks) | absence | absence | absence | absence | absence |
| Tack Test | 101 | 100 | 99 | 103 | 105 |
| Adhesiveness Test | 95 | 100 | 95 | 93 | 94 |
| Vulcanization Speed | 90 | 95 | 88 | 92 | 93 |
| Discoloration Test | | | | | |
| b‡ just after vulcanization | 0.74 | 0.15 | 0.01 | −0.24 | 0.11 |
| degree of discoloration just after vulcanization | 1 | 1 | 1 | 1 | 1 |
| b‡ after shelf test | −0.44 | 0.8 | −0.12 | 0.09 | 0.01 |
| degree of discoloration after shelf test | 1 | 1 | 1 | 1 | 1 |

| | Example 6 Composition 2 | Example 7 Composition 2 | Example 8 Composition 2 | Example 9 Composition 2 | Example 10 Composition 3 |
|---|---|---|---|---|---|
| Compound A | 1 | — | — | — | — |
| Compound B | — | 1.5 | — | — | — |
| Compound C | — | — | 1.5 | — | — |
| Compound D | — | — | — | 1.5 | — |
| Compound E | — | — | — | — | 1.5 |
| Compound F | — | — | — | — | — |
| Compound G | — | — | — | — | — |
| Compound H | — | — | — | — | — |
| Compound I | — | — | — | — | — |
| Compound J | — | — | — | — | — |
| 300% Modulus | 101 | 101 | 101 | 105 | 101 |
| Ozone Resistance (presence or absence of cracks) | absence | absence | absence | absence | absence |

TABLE 2-1-continued

| | | | | | |
|---|---|---|---|---|---|
| Tack Test | 101 | 100 | 98 | 99 | 99 |
| Adhesiveness Test | 98 | 98 | 98 | 95 | 95 |
| Vulcanization Speed | 91 | 86 | 91 | 90 | 90 |
| Discoloration Test | | | | | |
| b‡ just after vulcanization | −0.20 | −0.46 | −0.41 | −1.10 | −0.18 |
| degree of discoloration just after vulcanization | 1 | 1 | 1 | 1 | 1 |
| b‡ after shelf test | 0.73 | 0.16 | 0.21 | 1.10 | 0.33 |
| degree of discoloration after shelf test | 1 | 1 | 1 | 1 | 1 |

TABLE 2-2

| | Comparative Example 1 Composition 1 | Comparative Example 2 Composition 2 | Comparative Example 3 Composition 3 | Comparative Example 4 Composition 1 | Comparative Example 5 Composition 2 |
|---|---|---|---|---|---|
| Compound A | — | — | — | — | — |
| Compound B | — | — | — | — | — |
| Compound C | — | — | — | — | — |
| Compound D | — | — | — | — | — |
| Compound E | — | — | — | — | — |
| Compound F | — | — | — | 1.5 | 1.5 |
| Compound G | — | — | — | — | — |
| Compound H | — | — | — | — | — |
| Compound I | — | — | — | — | — |
| Compound J | — | — | — | — | — |
| 300% Modulus | 100 | 100 | 100 | 97 | 103 |
| Ozone Resistance (presence or absence of cracks) | absence | absence | absence | absence | absence |
| Tack Test | 100 | 100 | 100 | 102 | 105 |
| Adhesiveness Test | 100 | 100 | 100 | 95 | 93 |
| Vulcanization Speed | 100 | 100 | 100 | 98 | 99 |
| Discoloration Test | | | | | |
| b‡ just after vulcanization | 0.26 | −1.24 | −1.80 | 0.33 | −1.10 |
| degree of discoloration just after vulcanization | 1 | 1 | 1 | 1 | 1 |
| b‡ after shelf test | 3.32 | 3.62 | 2.10 | 2.95 | 2.23 |
| degree of discoloration after shelf test | 5 | 5 | 4 | 5 | 4 |

| | Comparative Example 6 Composition 2 | Comparative Example 7 Composition 2 | Comparative Example 8 Composition 2 | Comparative Example 9 Composition 2 |
|---|---|---|---|---|
| Compound A | — | — | — | — |
| Compound B | — | — | — | — |
| Compound C | — | — | — | — |
| Compound D | — | — | — | — |
| Compound E | — | — | — | — |
| Compound F | — | — | — | — |
| Compound G | 1.5 | — | — | — |
| Compound H | — | 1.5 | — | — |
| Compound I | — | — | 1.5 | — |
| Compound J | — | — | — | 1.5 |
| 300% Modulus | 101 | 106 | 100 | 105 |
| Ozone Resistance (presence or absence of cracks) | absence | absence | absence | absence |
| Tack Test | 100 | 103 | 80 | 78 |
| Adhesiveness Test | 97 | 97 | 83 | 81 |
| Vulcanization Speed | 98 | 97 | 98 | 91 |

TABLE 2-2-continued

| | | | | |
|---|---|---|---|---|
| Discoloration Test | | | | |
| b‡ just after vulcanization | −0.78 | −0.21 | −1.42 | −2.42 |
| degree of discoloration just after vulcanization | 1 | 1 | 1 | 1 |
| b‡ after shelf test | 0.08 | 2.30 | 1.60 | 2.53 |
| degree of discoloration after shelf test | 1 | 4 | 2 | 5 |

TABLE 3

| | Comparative Example 10 Composition 2 | Example 11 Composition 2 |
|---|---|---|
| | Compound A | |
| Discoloration Test | — | 1.5 |
| b* just after vulcanization | −0.11 | −0.20 |
| degree of discoloration just after vulcanization | 1 | 1 |
| b* after shelf test | 3.24 | 1.50 |
| degree of discoloration after shelf test | 5 | 2 |

In Table 2, the compound A is Kao's nonionic surfactant, trade name "Emulgen 1118" (polyoxyethylene alkyl ether), which corresponds to the above-mentioned formula (I) where $R^2$ is mainly $C_{11}H_{23}$, $R^1$ is $C_2H_4$, and n is 18, and which has an HLB value of 16.4;

the compound B is Kao's nonionic surfactant, trade name "Emulgen 123P" (polyoxyethylene lauryl ether), which corresponds to the above-mentioned formula (I) where $R^2$ is $C_{12}H_{25}$, $R^1$ is $C_2H_4$, and n is 23, and which has an HLB value of 16.9;

the compound C is Kao's nonionic surfactant trial sample, polyoxyethylene 2-ethylhexyl ether, which corresponds to the above-mentioned formula (I) where $R^2$ is $C_8H_{17}$, $R^1$ is $C_2H_4$, and n is 20, and which has an HLB value of 17.7;

the compound D is Kao's nonionic surfactant trial sample, polyoxyethylene 2-ethylhexyl ether, which corresponds to the above-mentioned formula (I) where $R^2$ is $C_8H_{17}$, $R^1$ is $C_2H_4$, and n is 30, and which has an HLB value of 18.4;

the compound E is Kao's nonionic surfactant, trade name "Emulgen 130K" (polyoxyethylene lauryl ether), which corresponds to the above-mentioned formula (I) where $R^2$ is $C_{12}H_{25}$, is $C_2H_4$, and n is 30, and which has an HLB value of 18.1;

the compound F is Kao's sorbitan-based nonionic surfactant, trade name "Rheodol TW-S106V", in which the long-chain alkyl group is $C_{17}H_{35}$, and the ethylene oxide addition molar number is 6, and which has an HLB value of 9.6;

the compound G is Kao's nonionic surfactant, trade name "Emulgen 120" (polyoxyethylene lauryl ether), which corresponds to the above-mentioned formula (I) where $R^2$ is $C_{12}H_{25}$ $R^1$ is $C_2H_4$, and n is 12, and which has an HLB value of 15.3;

the compound H corresponds to the above-mentioned formula (I) where $R^2$ is $C_{14}H_{29}$, $R^1$ is $C_2H_4$, and n is 4, and which has an HLB value of 9.4;

the compound I corresponds to the above-mentioned formula (I) where $R^2$ is $CH_3$, $R^1$ is $C_2H_4$, and n is 9, and which has an HLB value of 19.2;

the compound J is Kao's nonionic surfactant, trade name "Emulgen 430" (polyoxyethylene oleyl ether), which corresponds to the above-mentioned formula (I) where $R^2$ is $C_{18}H_{35}$, $R^1$ is $C_2H_4$, and n is 30, and which has an HLB value of 16.7.

As in Table 2, the rubber compositions of Examples 1 to 10 in which any of the compounds A to E was used were all free from discoloration after the outdoor shelf test for 1 month and kept good outward appearance, and in addition, the other physical properties thereof were also good. Further, the vulcanization speed of these compositions was high and the compositions were excellent in productivity. On the other hand, the rubber compositions of Comparative Examples 1 to 3 not containing a nonionic surfactant, as well as the other rubber compositions containing the compound E or the compound H that were said to be effective for enhancing the outward appearance of side wall portions in PTL 2 and PTL 1 or the compound J for use for workability improvement seriously discolored after the outdoor shelf test. The rubber composition containing the compound G had a good outward appearance, but the vulcanization speed thereof could not be high and the productivity thereof was not good. (For the invention of the discoloration preventing method, Comparative Example 6 is an example of the invention.) The compound I, which is similar to the compound for use herein and is described in JP-A 2001-123016 for use for workability improvement could be effective for enhancing the outward appearance, but lowers the tackifying power and the adhesion power; and therefore, the compound is difficult to use.

Those of which the difference between the value b* just after vulcanization and the value b* after the shelf test is smaller are better, as having a low degree of discoloration.

The compound A highly effective for preventing discoloration was incorporated in a rubber composition for tire treads and radial tires for passenger cars were formed of the composition and tested for discoloration. As shown in table 3, it is known that the compound A is effective for preventing discoloration of tires.

Examples 12 to 18 and Comparative Examples 11 to 17

A rubber composition comprising the formulation shown in Table 1 (in which the rubber component is mainly SBR) and containing the nonionic surfactant in the amount shown in Table 4 was prepared, and vulcanized at 160° C. for 14 minutes. Thus obtained, the vulcanized rubber was evaluated for the tensile stress, the ozone resistance and the discoloration degree thereof according to the methods mentioned above. The results are shown in Table 4.

In addition, from a composition prepared by incorporating the compound K into the rubber composition for tire treads, and from the rubber composition not containing a surfactant, radial tires for passenger cars each having a tire size of 205/65R15 were produced according to an ordinary method, and tested in the same discoloration test as above. The results are shown in Table 5.

TABLE 4

| | Comparative Example 11 Composition 1 | Comparative Example 12 Composition 2 | Comparative Example 13 Composition 3 | Comparative Example 14 Composition 1 | Comparative Example 15 Composition 2 | Comparative Example 16 Composition 2 |
|---|---|---|---|---|---|---|
| Compound K | — | — | — | — | — | — |
| Compound L | — | — | — | — | — | — |
| Compound M | — | — | — | — | — | 1.5 |
| Compound N | — | — | — | 1.5 | 1.5 | — |
| 300% Modulus | 100 | 100 | 100 | 97 | 100 | 99 |
| Ozone Resistance (presence or absence of cracks) | absence | absence | absence | absence | absence | absence |
| Discoloration Test | | | | | | |
| b‡ just after vulcanization | 0.26 | −1.24 | −1.80 | 0.33 | −1.10 | −1.95 |
| degree of discoloration just after vulcanization | 1 | 1 | 1 | 1 | 1 | 1 |
| b‡ after shelf test | 3.32 | 3.62 | 2.10 | 2.95 | 2.23 | 2.55 |
| degree of discoloration after shelf test | 5 | 5 | 4 | 5 | 4 | 5 |

| | Example 12 Composition 1 | Example 13 Composition 2 | Example 14 Composition 3 | Example 15 Composition 2 | Example 16 Composition 2 | Example 17 Composition 2 |
|---|---|---|---|---|---|---|
| Compound K | 1.5 | 1.5 | 1.5 | 2 | — | — |
| Compound L | — | — | — | — | 1.5 | 2 |
| Compound M | — | — | — | — | — | — |
| Compound N | — | — | — | — | — | — |
| 300% Modulus | 104 | 105 | 99 | 106 | 105 | 106 |
| Ozone Resistance (presence or absence of cracks) | absence | absence | absence | absence | absence | absence |
| Discoloration Test | | | | | | |
| b‡ just after vulcanization | −1.56 | −0.29 | −0.54 | −1.48 | −1.46 | −1.75 |
| degree of discoloration just after vulcanization | 1 | 1 | 1 | 1 | 1 | 1 |
| b‡ after shelf test | 0.26 | 1.35 | 0.65 | 0.41 | 1.69 | 0.75 |
| degree of discoloration after shelf test | 1 | 2 | 1 | 1 | 2 | 1 |

TABLE 5

| | Comparative Example 17 Composition 2 | Example 18 Composition 2 |
|---|---|---|
| | Compound K | |
| Discoloration Test | — | 1.5 |
| b* just after vulcanization | 0.11 | −0.20 |
| degree of discoloration just after vulcanization | 1 | 1 |
| b* after shelf test | 3.06 | 1.32 |
| degree of discoloration after shelf test | 5 | 2 |

In Table 4, the compound K is Kao's nonionic surfactant, trade name "Rheodol TW-L120" (polyoxyethylene sorbitan monococonut oil fatty acid ester), which is a mixture of a compound represented by the above-mentioned formula (II) where $R^2$ is mainly $C_{11}H_{23}$, $R^1$ is $C_2H_4$, and (l+m+n') is 20, and having an HLB value of 16.7, and a compound represented by the above-mentioned formula (III) where $R^2$ is mainly $C_{11}H_{23}$, $R^1$ is $C_2H_4$, and (l+m+n') is 20, and having an HLB value of 16.7;

the compound L is Kao's nonionic surfactant, trade name "Rheodol TW-L106" (polyoxyethylene sorbitan monolaurate), which is a mixture of a compound represented by the above-mentioned formula (II) where $R^2$ is $C_{11}H_{23}$, $R^1$ is $C_2H_4$, and (l+m+n') is 6, and having an HLB value of 13.3, and a compound represented by the above-mentioned formula (III) where $R^2$ is $C_{11}H_{23}$, $R^1$ is $C_2H_4$, and (l+m+n') is 6, and having an HLB value of 13.3;

the compound M is Kao's nonionic surfactant, trade name "Rheodol SP-L10" (sorbitan monolaurate), which is a mixture of a compound represented by the above-mentioned formula (II) where $R^2$ is $C_{11}H_{23}$, $R^1$ is $C_2H_4$, and l, m and n' are 0, and having an HLB value of 8.6, and a compound represented by the above-mentioned formula (III) where $R^2$ is $C_{11}H_{23}$, $R^1$ is $C_2H_4$, and l, m and n' are 0, and having an HLB value of 8.6;

the compound N is Kao's nonionic surfactant, trade name "Rheodol TW-S106V" (polyoxyethylene sorbitan monostearate), which is a mixture of a compound represented by the above-mentioned formula (II) where $R^2$ is $C_{17}H_{35}$, $R^1$ is $C_2H_4$, and (l+m+n') is 6, and having an HLB value of 9.6, and a compound represented by the above-mentioned formula (III) where $R^2$ is $C_{17}H_{35}$, $R^1$ is $C_2H_4$, and (l+m+n') is 6, and having an HLB value of 9.6.

From Table 4, it is known that the rubber compositions of Examples 12 to 17 did not discolor after the outdoor shelf test for 1 month; however, the rubber compositions of Comparative Examples 11 to 13 not containing a nonionic surfactant and the rubber compositions of Comparative Examples 14 to 16 containing the nonionic surfactant not falling within the scope of the present invention in that l, m and n' are 0 or $R^2$ is large greatly discolored after the outdoor shelf test.

The compound K highly effective for preventing discoloration was incorporated in a rubber composition for tire treads and radial tires for passenger cars were formed of the composition and tested for discoloration. As shown in table 5, it is known that the compound K is effective for preventing discoloration of tires.

Those of which the difference between the value b* just after vulcanization and the value b* after the shelf test is smaller are better, as having a low degree of discoloration.

The invention claimed is:

1. A tire, wherein an outer skin of the tire is formed of a rubber composition comprising at least one rubber component selected from a dienic synthetic rubber and a natural rubber and, as incorporated therein, at least one nonionic surfactant selected from the compounds represented by the following formula (I):

$$R^2O(R^1O)_nH \quad (I),$$

wherein in the formula (I), $R^2$ represents an alkyl group or an alkenyl group having from 8 to 12 carbon atoms, and the alkyl group and the alkenyl group may be any of linear chain, branched chain or cyclic ones; $R^1$ represents an alkylene group having 4 2 or 3 carbon atoms; n indicates a mean addition molar number, and is from 18 to 30;

wherein the rubber composition further comprises wax and an amine-based antiaging agent.

2. The tire according to claim 1, wherein the nonionic surfactant is incorporated in an amount of from 0.1 to 10 parts by mass relative to 100 parts by mass of the rubber component therein.

3. The tire according to claim 1, wherein the rubber component is at least one selected from a natural rubber, an isoprene rubber, a styrene-butadiene copolymer rubber and a polybutadiene rubber.

4. The tire according to claim 1, wherein the rubber component is a styrene-butadiene copolymer rubber alone, or a styrene-butadiene copolymer rubber and a polybutadiene rubber, or a natural rubber and a styrene-butadiene copolymer rubber, or a natural rubber and a polybutadiene rubber.

5. The tire according to claim 4, wherein the styrene-butadiene copolymer rubber is present in an amount of from 50 to 100 parts by mass in 100 parts by mass of the rubber component.

6. The tire according to claim 1, wherein the outer skin is a tread portion or a side wall portion of the tire.

7. A method for preventing discoloration of a rubber composition, comprising incorporating at least one nonionic surfactant selected from the compounds represented by the following formula (I) to at least one rubber component selected from a dienic synthetic rubber and a natural rubber:

$$R^2O(R^1O)_nH \ (I)$$

wherein in the formula (I), $R^2$ represents an alkyl group or an alkenyl group having from 8 to 12 carbon atoms, and the alkyl group and the alkenyl group may be any of linear chain, branched chain or cyclic ones; $R^1$ represents an alkylene group having from 2 or 3 carbon atoms; n indicates a mean addition molar number, and is from 18 to 30; wherein the rubber composition further comprises wax and an amine-based antiaging agent.

* * * * *